Nov. 1, 1966     D. E. MOORS     3,282,633
DYNAMICALLY STABLE GAS SPIN BEARING
Filed Aug. 7, 1961     2 Sheets-Sheet 1
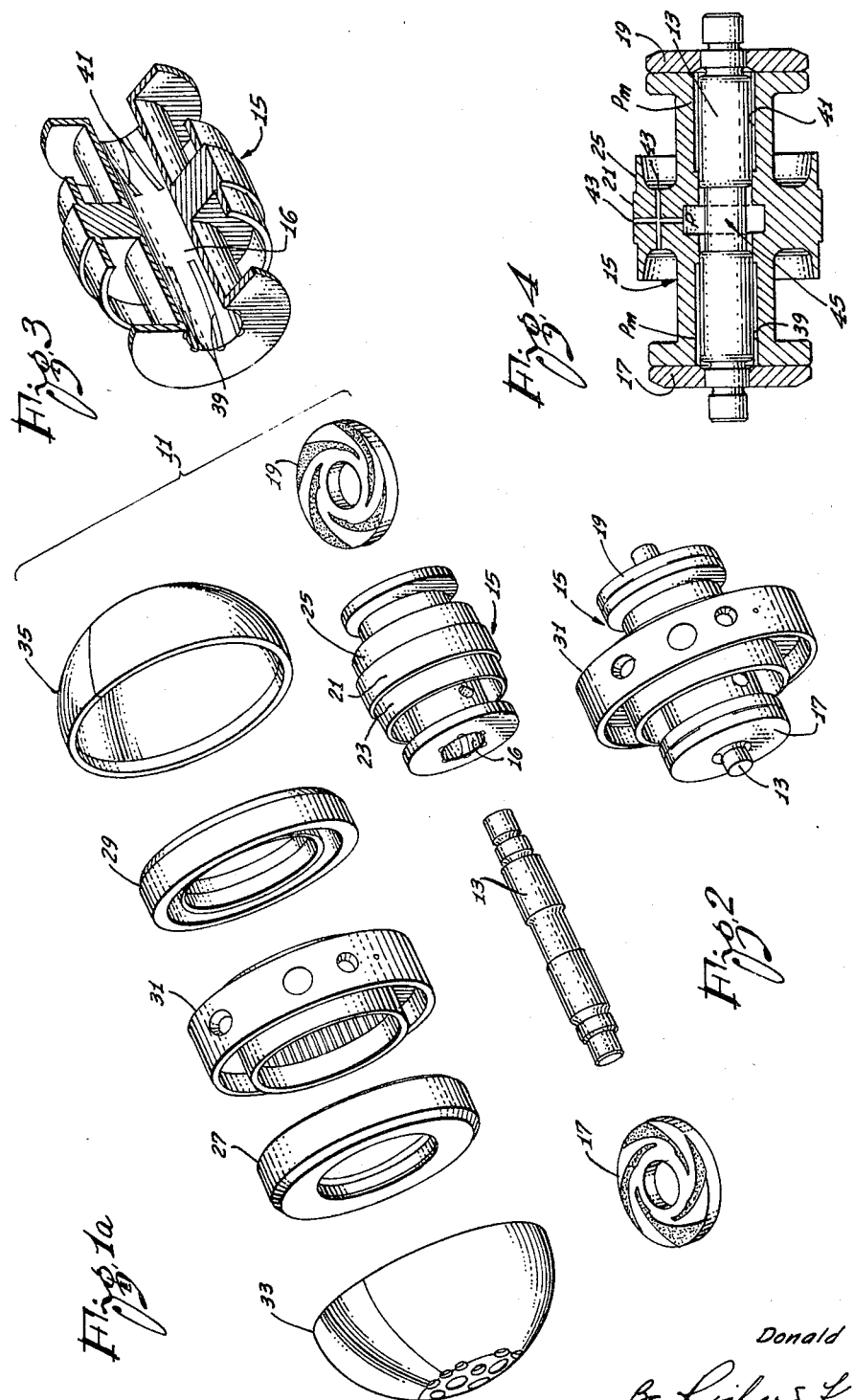
INVENTOR:
Donald E. Moors
By Richard L. Ehrlich
Attorney

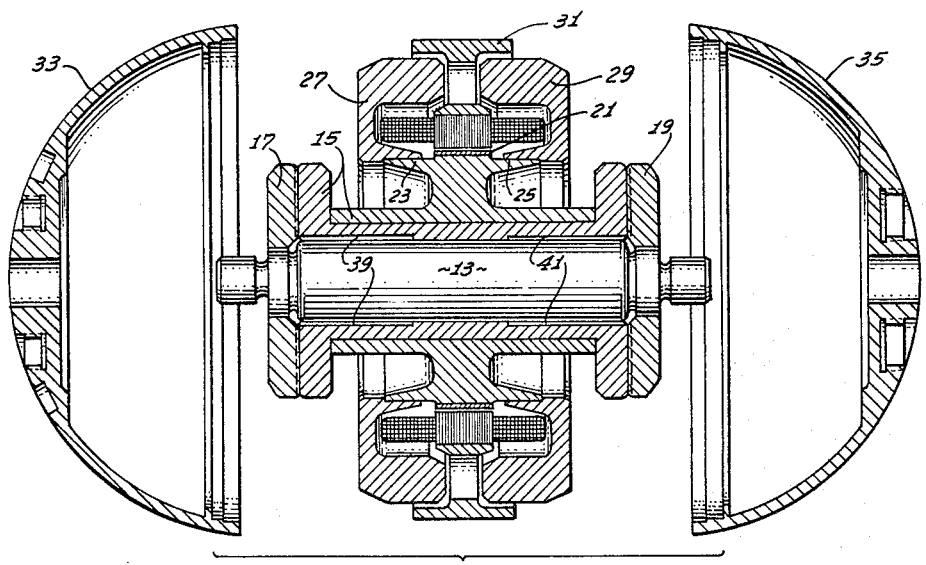

United States Patent Office 3,282,633
Patented Nov. 1, 1966

3,282,633
DYNAMICALLY STABLE GAS SPIN BEARING
Donald E. Moors, Los Angeles, Calif., assignor to Litton Systems, Inc., Beverly Hills, Calif.
Filed Aug. 7, 1961, Ser. No. 129,851
4 Claims. (Cl. 308—9)

The present invention relates to a gas spin bearing and more particularly to a gas spin bearing directing gas flow into the annular bearing aperture to eliminate half frequency instability.

In recent years, an ever growing demand has been developing especially in conjunction with the development of ultra precision instruments for bearings that are capable of operating at extremely high speeds such as 100,000 r.p.m.; at extremely high temperatures, such as 1200 degrees F.; without an oil lubricant; and at very low noise levels, which in the case of ball bearings, is almost impossible since some random vibration is always present in this type of bearing.

In order to fill this demand, designers have turned their attention to hydrodynamic gas lubricated bearings wherein a load supporting gas layer is directed into the clearance existing between the moving or rotatable member of the bearing and the stator member due to pressure differences which develop along the axes of the bearing as in the well-known Kingsbury thrust bearing. Accordingly, since the bearing surfaces are completely separated by the gas film, metal-to-metal contact is eliminated so that no wear is experienced by the bearing except during the starting and stopping operation.

As a result of the foregoing, the bearing has amazingly low friction properties and almost unlimited life. In addition, the bearing can operate without any fluid or oil lubricant so that lubricant leakage and contamination of the surrounding area and the associated fire hazards are completely eliminated as is the fact that the gas lubricant is not affected by radiation fields as is an oil lubricant. Also, since the viscosity of the gas increases with the temperature, contrary to the action of oil lubricants, gas spin bearings are capable of operating at extremely high temperatures, the upper temperature limits being determined only by the material from which the bearing and journal members are fabricated. However, despite all of the advantages of gas spin bearings, designers have discovered that their use is extremely limited due to the well-known half spin instability or whirl properties inherent in prior art spin bearings.

In accordance with the half spin instability phenomenon, at some predetermined speed of rotation, the rotatable member of the bearing commences to precess about the center of the stator member at a frequency approximately equal to half the spin frequency of the bearing rotor. Accordingly, the rotatable member wobbles or moves about its spin axis at approximately half the frequency of its spin. Hence, while this rotatable member wobble would, in itself, seriously limit the use of a gas spin bearing, it has been shown that during the occurrence of half frequency whirl, the load capacity of the bearing becomes extremely small so that the rotatable member comes into contact with the stator member whereby bearing operation is impossible since metal-to-metal contact is experienced.

It has been found that by minimizing the clearance between the bearing rotor and stator members, the predetermined spin frequency of the rotor at which whirl occurs can be increased so that the upper spin frequency limit can be concomitantly increased. However, in order to reduce the clearance between the rotor and stator members, the tolerances of the members must be quite exact. Hence, the resulting bearings are extremely difficult to manufacture and are, accordingly, quite expensive. In any case, even with the smallest clearances practical with the present state of the art, the predetermined whirl frequency is well below the spin frequency desired in ultra precision instruments such as, for example, ultra precision gyroscopes.

Furthermore, the accuracy of prior art gyroscopes utilizing gas spin bearings is further limited by substantial vibration rectification which results in part from the attitude angle of the bearing rotor member. More particularly, as it is well known to those skilled in the art, the center of the rotor member of a gas bearing will experience an angular displacement from the load line, the magnitude of the angular displacement being called the attitude angle of the member. It has been found that, in gyroscopes utilizing hydrodynamic gas bearings, the amount of vibration rectification introduced into the gyro operation is proportional to the magnitude of the attitude angle. Accordingly, in order to produce a highly accurate instrument using a gas spin bearing, the attitude angle of the bearing must be minimized.

In accordance with one of the prior art designs, it was attempted to increase the predetermined frequency at which one-half spin instability or whirl occurs and to minimize bearing attitude angle by modifying the cylindrical surface of the rotor member of a conventional journal bearing with a number of inclined planes or steps placed in sequence along the circumference of the cylindrical surface. In this manner, it was thought that the compression of the gases could be increased and that additional gas could be compelled to flow axially into the annular clearance space or aperture of the bearing. Accordingly, there would be an increase in the ambient gas pressure and the resistance of the bearing to loads. However, it was discovered that not only was there no appreciable increase in the frequency at which one-half frequency whirl occurs, nor a substantial diminishing of the attitude angle, but also on the other hand, the load capacity of the bearing was diminished to such a point that the bearing was rendered useless from a practical standpoint.

Accordingly, it should be apparent from the foregoing that there is a pressing need in the prior art for a gas spin bearing configuration which will not have the inherent limitations of prior art gas bearings. More particularly, there is a need for a bearing which has sufficient stiffness or resistance to loading that the predetermined frequency at which one-half spin instability or whirl occurs is substantially greater than the spin frequency required in ultra precision gyroscopes and other high accuracy instruments.

The present invention, on the other hand, overcomes the foregoing enumerated and other limitations of the prior art gas spin bearings by providing a gas spin journal bearing operable for directing additional supporting gas into the annular aperture between the rotor and stator members to increase the ambient pressure therein whereby the stiffness or load capacity of the bearing is increased and spin instability or whirl occurs only at a relatively high spin frequency. In addition, the attitude angle of the bearing is substantially reduced over prior art bearings. More particularly, in accordance with the present invention, a curved groove is wound or inscribed on one end of the cylindrical surface of the rotatable member while a second curved groove is counterwound or, in other words, inscribed in a direction opposite to the first groove on the other end of the rotatable member.

In one embodiment of the invention, an ultra precision gyroscope including a rotor-and-motor assembly is mechanized with a gas spin journal bearing including a journal member with thrust pads affixed at either end and a rotatable bearing member circumscribing the journal and being rotatable relative to the journal member, the rotorand-motor assembly being mounted to the bearing member. In accordance with the invention, a first helical groove is wound on the journal surface adjacent to one end of the journal while a second helical groove is counterwound on the journal surface adjacent to the other end of the journal so that supporting gas is forced into the region between the rotor and stator members from each end of the bearing. Accordingly, the bearing is capable of high speed rotation about the journal member without experiencing half spin whirl or instability. In addition, the attitude angle of the bearing is minimized whereby vibration rectification errors are reduced.

In another embodiment of the invention, a gas spin bearing having a rotor member with a pair of first and second helical grooves inscribed thereon is rotated about a journal member in a direction such that the grooves compel gas into the area between the rotor and journal members through an aperture midway between the ends of the bearing to produce an increased pressure region at the ends of the bearing whereby the bearing member has the additional advantage of having a substantial resistance to torsional forces applied to the bearing member.

It is, therefore, an object of the present invention to provide a highly stable gas spin bearing.

It is another object of the present invention to provide a gas spin bearing capable of rotating at an extremely high frequency without experiencing half spin whirl.

It is a further object of the present invention to provide an ultra precision gas spin bearing for use with gyroscopes and other ultra precision instruments.

It is still a further object of the present invention to provide relatively inexpensive gas spin bearing which is highly accurate and capable of achieving high spin rates.

The novel features which are believed to be characteristic of the invention, both as to its organization and method of operation, together with further objects and advantages thereof, will be better understood from the following description considered in connection with the accompanying drawing in which two embodiments of the invention are illustrated by way of example. It is to be expressly understood, however, that the drawing is for the purpose of illustration and description only, and is not intended as a definition of the limits of the invention.

FIG. 1a is a disassembled perspective view of a gyroscope mechanized in accordance with the invention;

FIG. 1b is a partially assembled view of the gyroscope of FIG. 1a;

FIG. 2 is a partially assembled view of the gyroscope of FIG. 1;

FIG. 3 is a fragmentary perspective view of a bearing member of the invention; and FIG. 4 is a cross-sectional view of another embodiment of the invention.

Referring now to the drawings wherein like or corresponding parts are referred to by the same reference characters throughout the several views, there is shown in FIG. 1a a three dimensional view of a disassembled ultra precision gyroscope 11 incorporating a gas spin bearing of the present invention. As is indicated in FIG. 1a, the gas spin bearing includes a stationary journal member 13, a rotatable bearing member 15 with a generally cylindrical bearing surface 16 and a pair of thrust pads 17 and 19.

Referring briefly to FIG. 2 wherein there is shown a partially assembled view of the gyro, it can be seen that except for its two end portions, journal 13 fits within the aperture in bearing 15 and thrust pads 17 and 19 fit on the end portions of the journal, the thrust pads maintaining the rotatable bearing in alignment with journal 13. In addition, as can be seen from FIG. 1a bearing 15 includes a hysteresis ring 21 flanked on each side by a pair of cylindrical flanges 23 and 25 to which are mounted a pair of inertia rings 27 and 29 which provide the required gyro mass and complete the gyro rotor-and-motor assembly. More particularly, rings 27 and 29 include a pair of flanges 24 and 26, respectively, flanges 24 and 26 being positioned in registry with flanges 23 and 25, respectively. As is apparent from the foregoing discussion, the gyro stator member includes an armature 31 and a pair of exterior hemispherical caps 33 and 35, the armature member circumscribing hysteresis ring 21 and cooperating therewith for applying a continuous torque to the rotor-and-motor assembly to rotate the assembly about journal 13.

Referring now to FIG. 1b, there is shown a partially assembled view of a gyroscope 11, with exterior hemispherical caps 33 and 35 removed from the assembly for clarity, illustrating the position of the assembled elements of the gyroscope. More particularly, as is shown in FIG. 1b bearing 15 and journal 13 are positioned in register with thrust pad 17 mounted on one end of the journal and pad 19 mounted on the other end while armature 31 of the gyro stator member circumscribes the hysteresis ring 21 of bearing element 15. Similarly, inertia rings 27 and 29 of the rotor are mounted on flanges 23 and 25, respectively.

Referring now to the rotor-and-motor assembly and to bearing 15 in particular detail, attention is directed to FIG. 3 wherein there is shown a fragmentary view of bearing 15 revealing the nature of cylindrical bearing surface 16. As is shown in FIG. 3, cylindrical surface 16 has a plurality of generally helical shaped grooves 39 inscribed on the bearing surface at one end and a similar plurality of grooves 41 inscribed on the surface at the other end. It should be noted that while the grooves are generally referred to herein as being located at one or the other end of the bearing surface for ease of description, it is clear that the grooves are inscribed on the bearing surface, commencing at the ends of the surface and extending inwardly along the cylindrical surface for a predetermined distance. It should be noted that while the helical grooves can be extended inwardly to the center region of the bearing surface, the bearing stiffness or load capability of the bearing is somewhat reduced over what is obtainable if the grooves extend inwardly toward the center of the bearing about one-third the actual length of the bearing.

It should be noted that while the grooves can be inscribed on bearing surface 16 by many different methods known in the art, one suitable method of inscribing the grooves thereon is by means of an S. S. White air abrasion machine. The S. S. White machine has been used satisfactorily to inscribe substantially helical grooves having a depth of .0001 of an inch on the bearing surface and such grooves have been found to function quite satisfactorily.

Continuing with the discussion of the invention, it is extremely important to note that the angle of inclination of the grooves must be related to the direction of rotation of the bearing member in such a fashion that the grooves at either end of the bearing member operate to compel gas into the channel or annular clearance between the surface of journal 13 and bearing surface 16 of bearing member 15. Accordingly, the grooves on one side of the bearing must be inscribed or wound oppositely to those on the other end or, in other words, the grooves should be wound on one end and counterwound on the other.

For example, it is apparent that when bearing 15 of FIG. 3 rotates in a counter clockwise direction, grooves 39 will attack the exterior gases in such a fashion that they will be forced into the annular clearance and will move axially there-along to the center of the bearing. In this same regard, it is clear that grooves 41 which are wound on the opposite end of the bearing also compel or pull gas into the annular region between the bearing and journal whereby the gas also moves axially toward the center of the bearing.

In view of the foregoing, it will be apparent that the grooves inscribed on the bearing surface act as gas pumps for pumping additional amounts of gas into the annular support aperture between the bearing and journal members. Accordingly, the pressure developed within the region will be substantially in excess of that developed if the grooves were not present and will gradually increase to a maximum midway between the ends of the bearing. Accordingly, the resulting bearing stiffness or load capability will be substantially enhanced. Furthermore, since the load capability is substantially increased relative to the forces tending to produce bearing instability, it is clear that the net stabilizing force is substantially greater in the case of a bearing utilizing the grooves than in the conventional bearing.

Accordingly, the forces tending to produce bearing instability must be substantially greater in the present invention than in prior art bearings in order to cause the bearing of the invention to experience instability. Hence, since the magnitude of the instability forces are directly related to the speed of rotation or spin of the bearing member, the bearing member can rotate at substantially greater spin rates than would be possible in a conventional type bearing without experiencing half spin whirl. Furthermore, it has been found that the magnitude of the bearing attitude angle is also substantially diminished by the use of the inscribed grooves of the invention.

Comparing the permissable spin rates of conventional gas spin bearings with those of the present invention, it should be pointed out that a gas spin bearing of the type shown in FIG. 1a has been constructed in accordance with prior art methods and found to be limited to 250 revolutions per second at which speed, half speed or instability occurred and bearing 15 commenced eccentric rotation at a revolution rate of approximately 125 revolutions per second. This same bearing, after being modified in accordance with the teachings of the invention, was found capable of experiencing spin rates up to 530 revolutions per second without any noticeable instability. In addition, vibration rectification was substantially reduced as was the bearing attitude angle.

Continuing with the discussion of the invention, numerous modifications and alterations may be made in the gas spin bearing just described without departing from the spirit and scope of the invention. For example, the embodiment of the invention shown in FIG. 1a can be modified somewhat so that the maximum gas pressure is developed at or near the ends of the bearing rather than midway between the ends. Accordingly, the bearing has a greater resistance to torsional moments.

In this regard, attention is directed to FIG. 4 wherein there is shown a side cross-sectional view of a second embodiment of the invention wherein bearing member 15 has helical grooves 39 and 41 spiraling in a reverse manner to the first embodiment of the invention and in addition, an aperture 43 in bearing 15 for connecting the mid-point of the annular aperture between the bearing and journal surfaces to external or ambient gas pressure. In accordance with the reversal in grooves 39 and 41, gas is pumped through aperture 43 into the annular support region and axially along grooves 39 and 41 toward the ends of the bearings. Accordingly, as shown in FIG. 4, the gas pressure midway between the bearing ends is approximately at the ambient or external gas pressure P while the gas pressure from the midpoint increases from this point axially in both directions to a point of maximum pressure $P_m$ just before reaching the ends of the bearing surface. In accordance with this pressure distribution, the maximum bearing support is located at or near the ends of the bearing so that the bearing stiffness or resistance to externally applied moments tending to rotate the bearing about axes orthogonal to the spin axis and running through point 45 is substantial.

Continuing with the discussion of the invention, it should be noted that thrust pads 17 and 19 can be made to cooperate with the helical grooves on the bearing surface to increase the bearing stiffness by use of pads having a number of curved grooves on the thrust pads, as is shown in FIG. 1a. Accordingly, the relative motion between thrust pads 17 and 19 and the bearing causes gas to be compelled into the region between the bearing and the thrust pads so that the pressure differential between the two members increases to a pressure maximum at a point adjacent the annular aperture defined by the spacing between journal member 13 and bearing 15. This, of course, raises the ambient gas pressure just outside the annular aperture whereby the gas pressure within the annular aperture area is further increased. Accordingly, the stiffness or load bearing capacity of the bearing is likewise increased.

It should be clear from the foregoing discussion that numerous modifications and alterations may be made in the invention. More particularly, it is clear that the invention need not be limited to any particular type of groove surface on the bearing member. In this regard, it should be noted that all that is necessary is that the grooves have a general configuration such that upon rotation of the rotor member, gas will be compelled or pulled into the annular shaped support aperture or region existing between the bearing rotor and stator members. Furthermore, it is not absolutely necessary that the groove members be on the rotor member. However, it is believed to be desirable. Accordingly, it is to be expressly understood that the spirit and scope of the invention is to be limited only by the scope of the appended claims.

What is claimed as new is:

1. A dynamically stable gas spin bearing, comprising: a first journal member having a first axially extended cylindrical surface and a second bearing member having a second axially extended cylindrical surface said second surface being positioned in registry with said first surface to form an aperture between said first and second surfaces, one of said first and second members being rotatable with respect to the other;

a gas pervading the aperture between said first and second surfaces;

means responsive to relative rotation of said first and second members for supporting said first and second members apart on a pressurized layer of said gas, said means including apparatus responsive to the relative rotation for developing an axially increasing pressure of said gas from a predetermined first region of said aperture to an axially remote second region of said aperture, said apparatus comprising a plurality of spiral grooves established in one of said cylindrical surfaces and generally extending between said first and second regions and responsive to the relative rotation for pressurizing said gas toward said second region, said apparatus further including means for substantially preventing outflow, from said second region of said aperture, of gas pressurized toward said second region by said spiral grooves.

2. The combination defined by claim 1 wherein said means for preventing outflow of gas comprises a grooved end thrust bearing connected to one of said first and second members and positioned adjacent said second region and responsive to the relative rotation of said first and second members for pressurizing gas toward said second region to substantially prevent outflow of gas therefrom.

3. The combination defined by claim 1 wherein said means for preventing outflow of gas from said second region includes a bearing housing portion enclosing said second region and further includes a second plurality of oppositely counterwound spiral grooves established on one of said surfaces, beyond said second region and responsive to the relative rotation of said first and second members for developing an axially-increasing oppositely-directed pressure of said gas toward said second region, to substantially prevent outflow of gas from said second region.

4. The combination defined by claim 1 which further includes means for admitting gas to said first region.

References Cited by the Examiner

UNITED STATES PATENTS

| | | | |
|---|---|---|---|
| 1,980,081 | 11/1934 | Ovington. | |
| 1,986,807 | 1/1935 | Gillmor | 33—226 |
| 2,229,237 | 1/1941 | Brenkert | 308—122 |
| 2,249,843 | 7/1941 | Marsland | 308—122 |
| 2,822,694 | 2/1958 | Mc Kenney | 74—57 |
| 2,864,522 | 12/1958 | Anderson | 308—9 |
| 2,880,616 | 4/1959 | Aumuller | 74—5.7 |
| 3,025,708 | 3/1962 | Slater et al. | 74—5.46 |

DAVID J. WILLIAMOWSKY, *Primary Examiner.*

FRANK SUSKO, SAMUEL FEINBERG, *Examiners.*

P. F. STAHL, *Assistant Examiner.*